United States Patent [19]
Conoval

[11] 4,158,962
[45] Jun. 26, 1979

[54] CABLE TENSION MEASURING APPARATUS

[76] Inventor: Paul Conoval, 2200 N. Central Rd., Fort Lee, N.J. 07024

[21] Appl. No.: 883,300

[22] Filed: Mar. 3, 1978

[51] Int. Cl.² .................................................. G01L 5/10
[52] U.S. Cl. .................................... 73/143; 73/DIG. 1
[58] Field of Search ............ 73/DIG. 1, 143, 517 AV, 73/579, 581, 704, 778; 177/210 FP

[56] References Cited

U.S. PATENT DOCUMENTS

| | | | |
|---|---|---|---|
| 2,618,970 | 11/1952 | Hitchcock et al. | 73/143 |
| 3,394,587 | 7/1968 | Freeman | 73/143 |
| 3,540,271 | 11/1970 | Hoff | 73/143 |
| 3,854,329 | 12/1974 | Jones | 73/143 |
| 3,871,217 | 3/1975 | Miley | 73/143 |
| 3,942,369 | 3/1976 | Ruggenstein et al. | 73/143 |
| 3,958,459 | 5/1976 | Shimomura | 73/DIG. 1 |

FOREIGN PATENT DOCUMENTS

| | | | |
|---|---|---|---|
| 2337884 | 2/1975 | Fed. Rep. of Germany | 73/DIG. 1 |
| 556359 | 5/1977 | U.S.S.R. | 73/DIG. 1 |

*Primary Examiner*—Charles A. Ruehl

[57] ABSTRACT

A method and apparatus is provided for measuring tension in stressed cables in which use is made of the relationship between the tension and the natural frequency of vibration of the cable. An electrical signal is generated by sensing the fluctuating field of a small permanent magnet attached to the vibrating cable and generating from this signal a periodic pulse signal having an average level proportional to the square of the cable variation frequency. The resulting signal is scaled to produce a final signal which is directly proportional to cable tension.

12 Claims, 8 Drawing Figures

CABLE TENSION MEASURING APPARATUS

BACKGROUND OF THE INVENTION

This invention relates to methods and apparatus for measuring tension in stressed cables and in particular to methods and apparatus which utilizes the relationship between the natural transverse vibrations in the cable and the tension in the cable.

It is often necessary to ascertain the tension value of stressed cables in a quick, reliable manner without permanent attachment of a measuring device thereto. In applications involving guy wires, mast supports, tension structures etc., measurement of cable tension becomes necessary in order to adjust stressed members for desired values and for balancing interacting elements thereof. Alternatively, tension measurements are necessary for the apprisal of excessive cable stresses thereon.

A known method for determining tension in a given length of stressed cable incorporates the knowledge of the natural frequency of vibration of the length of cable. The relationship between the tension and the fundamental frequency of transverse vibration is expressed by:

$$F = (\tfrac{1}{2}L)\sqrt{S/r}, \text{ or}$$

$$S = (2LF)^2 r$$

where
S = tension in the cable
L = length of unsupported cable free to vibrate
F = fundamental frequency of vibration of the length of cable.
r = linear mass density of the cable Prior art tension measuring devices such as U.S. Pat. No. 3,540,271 determine tension in stressed cables by ascertaining the value of the fundamental frequency of vibration thereof and utilizing this value to represent cable tension. Let it be noted from the established tension-frequency formula that tension in a stressed cable is proportional to the square of the vibration frequency and the square of the length of cable being measured. Such prior art devices however, obtain tension readings indirectly by displaying a signal proportional to the cable frequency on an indicating device such as a meter, the scale of which is calibrated in proportion to the square root of tension in order to account for the nonlinear relationship between tension and frequency. Readings calibrated in this manner however result in nonuniform resolution within the range of the scale, indicia being more densely distributed at the higher end than at the lower end thereof, which significantly limits the the accuracy and the ease of readability of such devices.

Another prior art device converts a signal which is proportional to frequency to one which is proportional to a frequency squared signal by employing a conventional squaring circuit. Most squaring circuits however are very sensitive, relatively expensive, and involve complex circuitry.

Prior art tension meters have also included devices to sense the vibrational motion of the cable which require accurate positioning with respect to the cable because of the weak signals generated therefrom. Such devices are often fixed in a permanent position of close proximity to the cable being measured.

Other cable tension measuring devices have included relatively complex mechanisms for exciting the cable into its natural oscillations. Such prior art devices include magnetic type excitation and sensing mechanisms which require the cable to be composed of a metal and often a ferrous material. Such devices have been bulky, cumbersome, expensive, and require complex electronics to accomplish the measurement.

The term "cable" hereinafter comprehends a rope, wire, chain, or any object which essentially functions in the same manner as such a cable.

SUMMARY OF THE INVENTION

The invention described herein provides a method and apparatus for measuring tension in a cable of known length and linear mass density by sensing the natural fundamental frequency of vibration thereof, which includes the steps of affixing a small permanent magnet to the cable, imparting a disturbance to the cable thereby causing the cable, hence the magnet thereon to vibrate, then subjecting a pickup coil to the fluctuating magnetic field generated by positioning the pickup coil in close proximity but in a noncontact relationship to the vibrating magnet. The electrical signal induced in the pickup coil is converted to a periodic pulse signal having a frequency equal to the cable vibration frequency then generating from this signal another periodic pulse signal having an average level proportional to the square of the cable vibration frequency. This signal is then scaled so as to account for the length and linear mass density of the cable, then applied to a meter in order to visually indicate a direct tension measurement.

It is therefore an object of this invention to provide an apparatus for measuring the tension in a stressed cable which is free to vibrate transversely between two supports, regardless of the material of composition of the cable.

Another object of this invention is to provide a cable tension measuring device which is small in size, portable, inexpensive, battery powered, and operative while being hand held.

Another object of this invention is to provide a direct accurate indication of tension on a meter in which the scale is linear.

A further object of this invention is to provide a cable tension measuring device which includes a simple, insensitive mechanism for converting cable vibration to an electrical signal.

Yet another object of this invention is to provide a method and apparatus for obtaining a quick reliable measurement of cable tension which can be used as a general field instrument, not specifically adapted or permanently attached to the cable.

The above objects and other objects inherent in the present invention will become more apparent when read in conjunction with the following specification and drawings.

DESCRIPTION OF THE PREFERRED EMBODIMENTS

Figure 1:
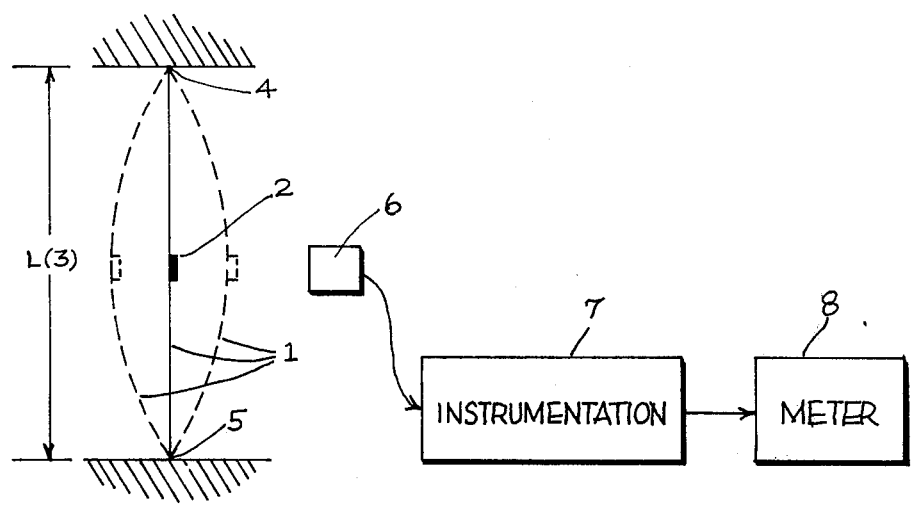
FIG. 1 is a schematic illustration of this invention with particular reference to the utilization of this device for measuring the tension of a stressed cable suspended and and vibrating between two fixed supports.

Referring to FIG. 1 there is illustrated a typical arrangement for the utilization of this device in which stressed cable 1 of known length L(3) is fixed and supported at each of its ends 4 and 5 such that the cable is free to vibrate transversely when a disturbance is imparted upon it. The cable being fixed and supported at its ends serves to illustrate the operation of this invention although any means of suspending a cable in a manner such that it maintains a constant length of vibratory stretch is satisfactory for the proper operation of the present invention.

Figure 8:
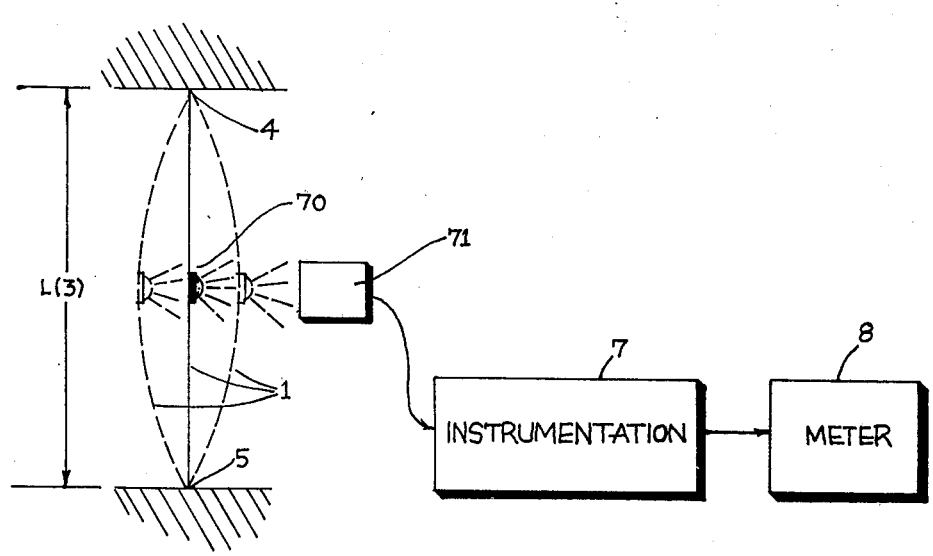
FIG. 8 is a schematic diagram of a modified form of FIG. 1 for measuring the tension of a stressed cable.

A small permanent magnet 2 is affixed to cable 1 at a convenient point thereon such that it can be easily exposed to pickup coil 6. The size and weight of permanent magnet 2 is such that its effect on the vibrating cable is negligible. Although in this preferred embodiment a magnet and pickup coil are incorporated to sense cable vibration, other "radiating elements" and associated sensing means can be utilized to accomplish similar results. "Radiating element" hereinafter refers to a material or object capable of producing a physical effect which can be observed or sensed at a distance from said material or object by appropriate sensing means. For example the radiating element and sensing means may take the form of a light source 70 and photodetector 71 respectively, as illustrated in FIG. 8.

In the present device transverse vibrational motion is induced in the cable by the action of a physical disturbance imparted to the cable as by plucking or striking the cable. The cable alternatively can be excited into its natural vibration by the transmission of energy through either of the supports 4 or 5, resulting from movement of the supporting system.

Pickup coil 6 is held in close proximity to the vibrating cable 1 at a point near where permanent magnet 2 is affixed. The fluctuating magnetic field resulting from the magnet's vibration induces an electrical signal in the pickup coil.

Sensing cable vibration in this manner has several advantages. First, tension measurements can be obtained without restriction as to cable diameter or material of composition. Secondly, positioning of the pickup coil with respect to the magnet is noncritical since the vibrating magnet has associated with it a large fluctuating magnetic field which can be sensed at a relatively large distance from the magnet. Thirdly, this feature enables measurements of tension to be obtained with the present device while being hand held, thus is easily adaptable for portability and for obtaining quick accurate tension readings.

The signal from pickup coil 6 is applied to instrumentation 7 wherein means are provided for generating a signal having an average level proportional to the cable tension, then applied to meter 8 whereby indicia of tension is displayed.

The natural fundamental frequency of vibration of the cable is the dominant mode of vibration and as it has been previously established, the tension in a stressed cable in which the vibrational stretch is constant is related to the linear mass density, the fundamental frequency of vibration, and the length of the cable between supports by:

$$S=(2LF)^2 r$$

The parameters of linear mass density r, and the length L are usually known but the value of F squared is determined by the present device as will be described hereinafter. Relative measurements of cable tension may be obtained without the knowledge of r or L however by comparing readings to other cable readings, or alternatively by comparing results to a predetermined meter reading.

Figure 2:
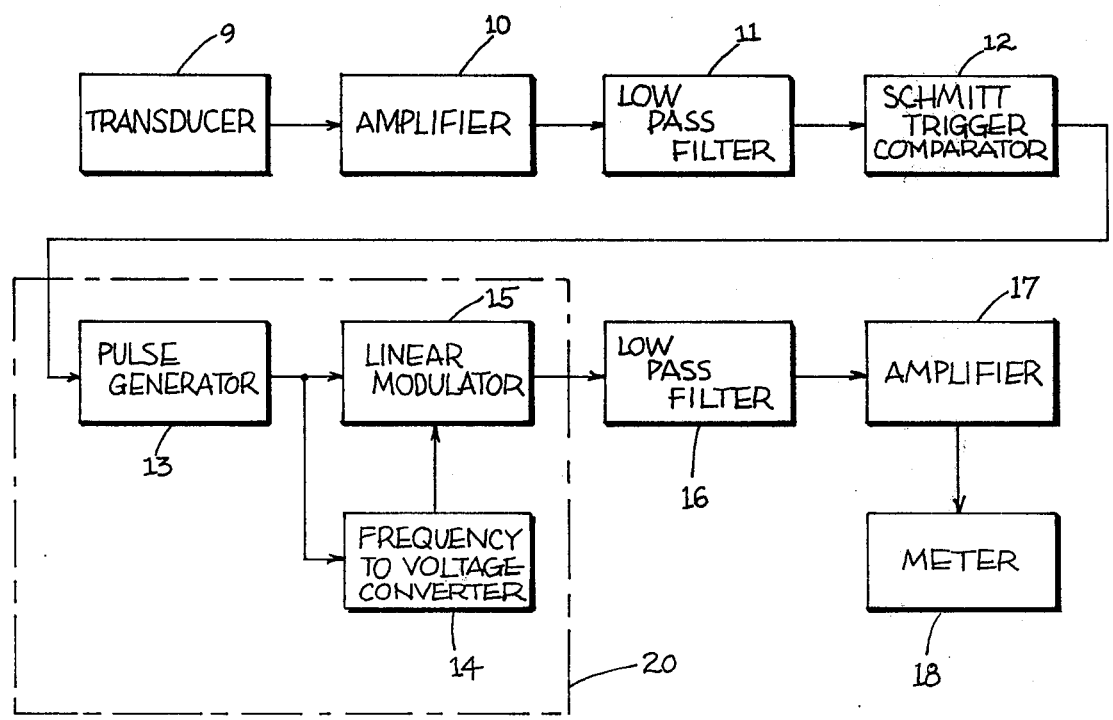
FIG. 2 is a system block diagram of the implementation of the instrumentation referred to in FIG. 1.

Referring to the block diagram of FIG. 2 transducer 9 which for example is the pickup coil 6 of FIG. 1, generates a signal representative of the natural vibration of the cable being measured. This signal is applied to amplifier 10, then lowpass filtered by 11 in order to suppress the effects of higher harmonics so that only the fundamental frequency is considered. Schmitt trigger comparator 12 then produces from the filtered signal a square waveform which has a frequency equal to the fundamental frequency of vibration of the cable. 12 functions as a threshold detector having hysteresis so that the output waveform is essentially independent of the input amplitude provided that the input signal is of sufficient amplitude to overcome the limits of the hysteresis range. This insures that the signal being measured is derived from the vibrating cable and not from extraneous noise. The output of 12 is fed to pulse generator 13 which modifies the square wave signal by producing a polarized pulse for each period thereof. There is no restriction as to the shape of the pulse generated by 13 although for this embodiment a rectangular pulse is produced. The output of 13 is then applied to both frequency to voltage converter 14, and to one input of linear modulator 15. 14 produces a signal representative of the frequency of the output of 13 by generating a D.C. signal proportional to the frequency, or alternatively by generating a varying signal having an amplitude proportional to the frequency thereof. The resulting signal is fed to the second input of linear modulator 15.

Linear modulator 15 may for example be a pulse amplitude modulator whereby the amplitudes of the pulses generated by 13 are made proportional to the frequency of repetition thereof. Alternatively, 15 may be a pulse width modulator whereby the widths of the pulses generated by 13 are made proportional to the frequency thereof.

Linear modulator 15 therefore produces a periodic pulse signal having a frequency equal to the cable vibration frequency and an average level proportional to the square of the cable vibration frequency. This follows from the fact that the average value of a periodic pulse signal is equal to the integral of a single pulse divided by its repetition period. The integral of the modulated pulse generated by 15 is proportional to the cable vibration frequency, and the reciprocal of the period is equal to the cable vibration frequency therefore as a result of the described division a frequency squared value is produced. This will be described in more detail hereinafter.

The output of 15 is lowpass filtered by 16, amplified by 17 which has a gain corresponding to the product of the squared length and the linear mass density of the cable, then applied to meter 18 which gives a direct linear reading of cable tension.

Figure 3:
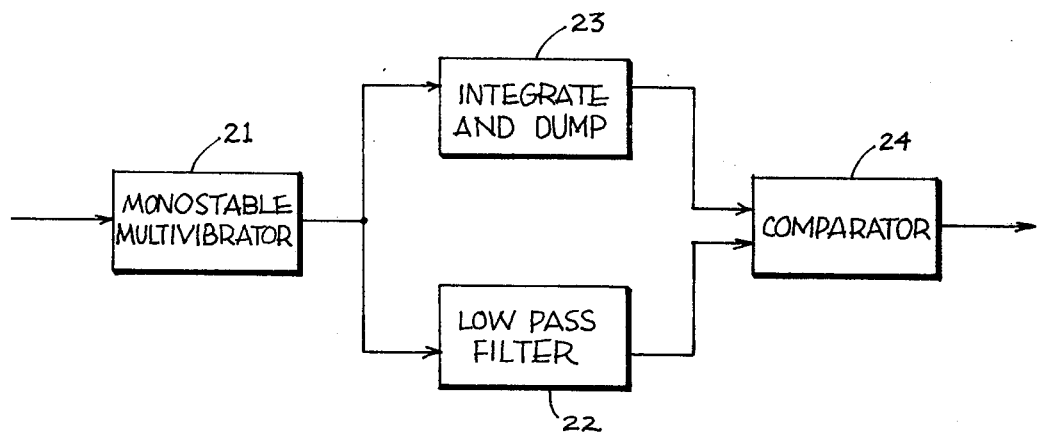
FIG. 3 and FIG. 4 are block diagrams of components of the system of FIG. 2.

Referring to FIG. 3 there is illustrated a more detailed block diagram of the circuits comprising circuit 20 of FIG. 2. The output of 12 of FIG. 2 is applied to monostable multivibrator 21 which produces a constant width rectangular pulse which is triggered for example by each negative going transition of the square wave signal from 12. The output of 21 is fed simultaneously to lowpass filter 22 and integrate and dump circuit 23. Lowpass filter 22 produces a D. C. signal having a level proportional to the frequency of its input signal, and integrate and dump network 23 integrates the output of 21 during its positive cycle or is otherwise reset to zero. The resulting signal is fed into one input of comparator 24, and the D.C. signal is fed into the second input of 24.

Comparator 24 produces as an output a series of pulses, the widths of which are proportional to the cable vibration frequency, repeating at a frequency equal to the cable vibration frequency. The average value of this signal is proportional to the square of the fundamental frequency of vibration of the cable.

The operation of the system of FIG. 2 incorporating the circuits of FIG. 3 will now be explained by reference to the waveforms of FIG. 5. The signals generated by circuits 12,21,22,23 and 24 are illustrated by waveforms a,b,c,d and e respectively of FIG. 5. Signal a is a generally square wave produced by 12 and signal b is a wavetrain of constant width pulses derived from, and having the same frequency as waveform a. Lowpass filtering signal b produces signal c which is a D.C. signal having a level proportional to the frequency of signal b.

Waveform d is generated by integrate and dump circuit 23 whereby a ramp function is initiated at each positive transition of waveform b. Simultaneously at the output of 24 a constant amplitude step is initiated therewith. The value of the ramp at any instant is proportional to the time elapsed from the start of each ramp, and when this value becomes equal to the level of c, the step is reset to zero thus producing waveform e.

Signal c essentially pulse width modulates signal b thereby producing periodic pulse signal e having both a pulse width proportional to the cable vibration frequency and a period equal to the cable vibration period. It is well known that the average value of a periodic pulse signal of constant amplitude is proportional to the pulse width divided by the repetition period. Dividing the pulse width value of waveform e by its period T, results in a signal having an average value proportional to the square of the cable vibration frequency. The averaging described herein is accomplished by lowpass filter 16 of FIG. 2.

Figure 4:
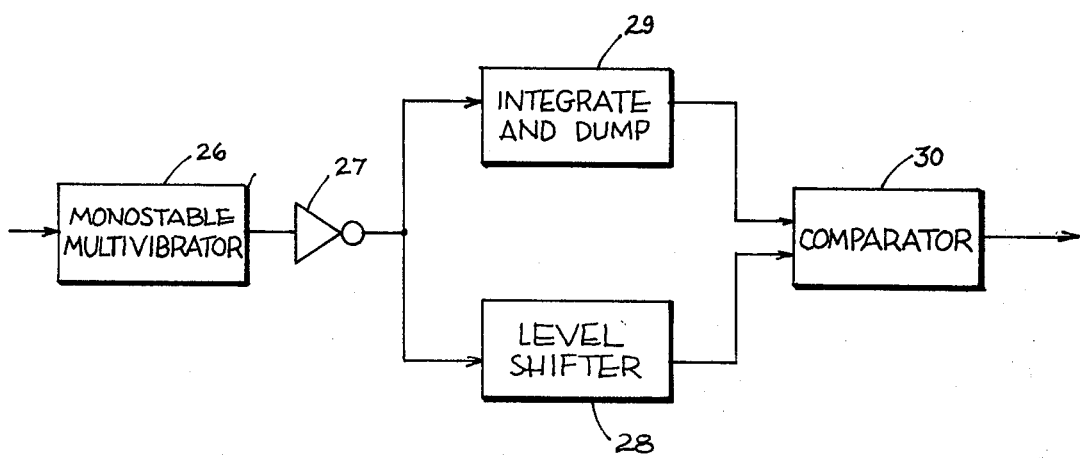

Referring to FIG. 4 there is illustrated a modification of FIG. 3 which decreases the overall response time of the system of FIG. 2. The function of the monostable multivibrator 26 is the same as that of 21 of FIG. 3. The output of 26 is inverted by 27, then is fed simultaneously to level shifter 28 which may be for example an RC highpass filter with a relatively long time constant, and integrate and dump circuit 29. 28 subtracts the D.C. component of the inverted pulse signal from 27, and 29 integrates the inverted pulse signal during its positive cycle or is otherwise reset to zero. The outputs of 28 and 29 are each fed to separate inputs of comparator 30.

Figure 5:
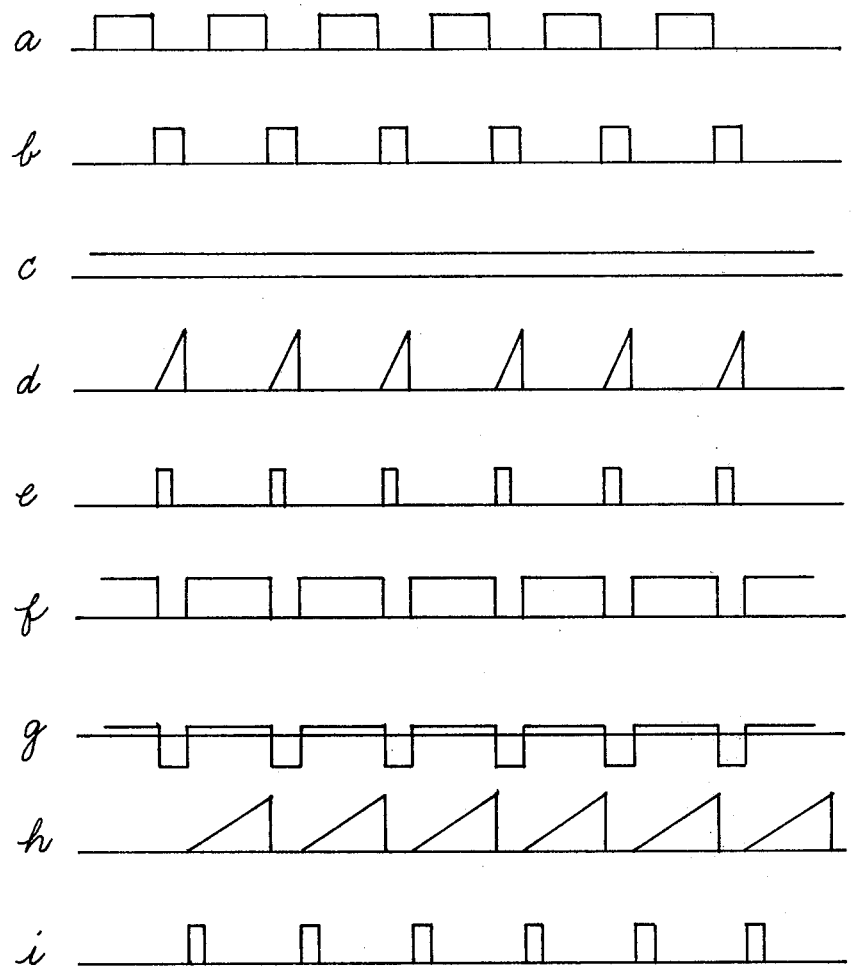
FIG. 5 is a graph showing waveforms at various locations of the tension measuring device.

The signals generated by circuits 27,28,29 and 30 are illustrated by waveforms f,g,h and i respectively of FIG. 5. The inverted pulse signal f, is highpass filtered by 28 which results in waveform g. The positive amplitude of g is proportional to the cable vibration frequency which will now be explained by considering a pulse width w, pulse amplitude equal to unity, vibration frequency F, and corresponding period T.

The average value Vav, of a periodic pulse waveform is expressed as:

$$Vav = (1/T) \int_0^T x(t)dt$$

where x(t) describes the waveshape in a single period of the signal. Evaluating this expression for waveform g yields:

$$Vav = (1/T)(A(T-w)-Bw)$$

where A is the positive magnitude and B is the negative magnitude of signal g. The average value of waveform g is zero therefore this expression can be rewritten as $$(w/T)(A+B)=A$$

but since the pulse amplitude is assumed equal to unity, $A+B=1$ and $$w/T=A$$

or equivalently $$A=wF$$

which verifies that the positive magnitude of waveform g is proportional to the frequency of the signal.

Waveform h is generated by integrate and dump circuit 29 whereby a ramp signal is initiated at each positive transition of waveform f. Whenever signal g is greater than signal h, a positive signal is present at the output of comparator 30 which is illustrated by i. The resulting signal i, is a periodic pulse signal having a frequency equal to the cable vibration frequency and having an average level proportional to the square of the cable vibration frequency.

Figure 6:
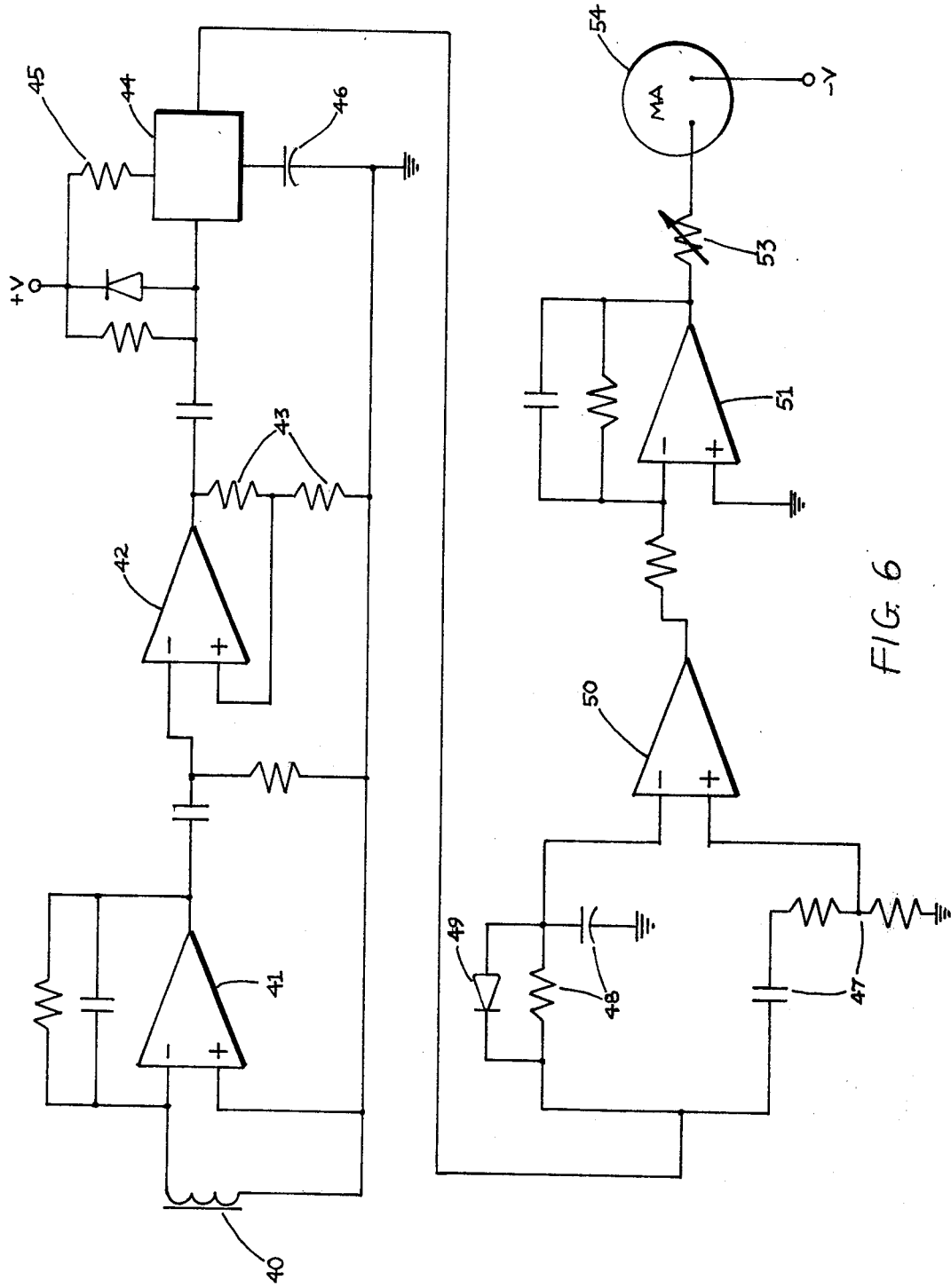
FIG. 6 is a schematic diagram of circuits for a preferred embodiment of the tension measuring apparatus.

Referring to FIG. 6 a circuit diagram of FIG. 2 in combination with FIG. 4 is illustrated. The signal from pickup coil 40 is amplified by operational amplifier 41 which contains in its negative feedback path a resistor and capacitor which essentially functions as a lowpass filter having a gain. Operational amplifier 42 is wired as a Schmitt trigger comparator having a hysteresis range determined by the two positive feedback resistors 43. An LM555 timing circuit 44, wired as a monostable multivibrator generates an inverted constant width pulse for each negative going transition of the square wave output of 42. The pulse width is determined by the time constant associated with resistor 45 and capacitor 46. The output of 44 is first highpass filtered by RC combination 47 which in effect shifts the level of the signal so that the amplitude of the positive portion is proportional to the frequency of vibration of the cable as described previously. Secondly the output of 44 is integrated by RC combination 48 during its positive cycle and reset to zero otherwise due to the forward biasing of diode 49. Operational amplifier 50 functions as a comparator which has as its positive input the output of 47, and as its negative input the output of 48. The output of 50 is then amplified and lowpass filtered by operational amplifier 51, scaled by variable resistor 53, then applied to meter 54.

Various parameters in the systems of FIG. 6 can be varied in order to account for the length, and linear mass density of the cable being measured. Parameters such as the time constants of 47 and 48, the pulse width of 44, the gain of amplifier 51, or the value of the scaling resistor 53 all in effect multiply the squared frequency signal generated. Appropriate adjustment of these parameters thereby generates a final signal proportional to the frequency of vibration squared, the length squared, and the linear mass density of the cable being measured.

Figure 7:
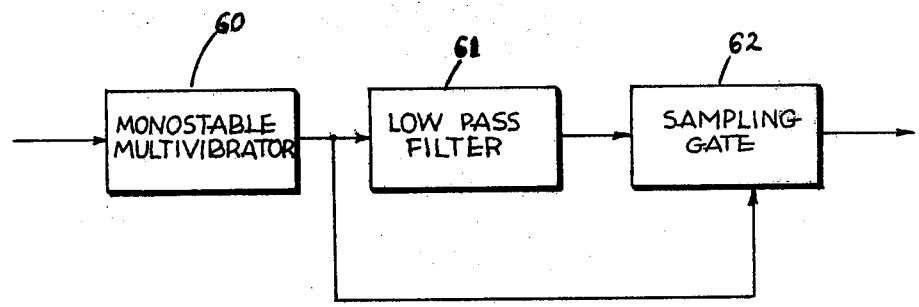
FIG. 7 is a block diagram of components of the system of FIG. 2 for an alternative embodiment thereof.

FIG. 7 illustrates an alternative embodiment of circuit 20 of FIG. 2. The square wave output of 12 is applied to monostable multivibrator 60 which produces a constant width, constant amplitude pulse for each period of vibration of the cable. This signal is lowpass filtered by 61 which produces a D.C. signal having a level proportional to the cable vibration frequency. Sampling gate 62 which for example is a CD4016 bilateral switch, passes the D.C. signal from 61 during the time when a control pulse is present, or otherwise has a zero output. The positive portion of the periodic pulse signal from 60 functions as the control signal for sampling gate 62. The resulting output from 62 is therefore a periodic pulse signal having constant pulse widths and having pulse amplitudes proportional to the frequency of vibration of the cable.

The average value of the signal from 62 is proportional to the square of the cable vibration frequency since the average value of a periodic pulse signal of constant width is proportional to the pulse amplitude divided by the repetition period thereof.

While the invention has been described with reference to certain preferred embodiments thereof, it is understood that the present disclosure has been made only by way of example and that various modifications and other embodiments thereof may be resorted to without departing from the spirit and scope of the invention as hereinafter claimed.

I claim:

1. Apparatus for measuring the tension in a length of stressed cable comprising:
   means for generating an electrical signal having a frequency equal to the natural frequency of vibration of the cable;
   means for generating from said electrical signal a periodic pulse signal having a frequency equal to the cable vibration frequency and having an average level proportional to the square of the cable vibration frequency; and
   means for scaling said periodic pulse signal to produce a signal having an average level proportional to the cable tension.

2. Apparatus for measuring the tension in a length of stressed cable comprising:
   first means for generating an electrical signal having a frequency equal to the natural frequency of vibration of the length of cable;
   second means for generating from said electrical signal a first periodic pulse signal having a frequency equal to the cable vibration frequency;
   third means supplied with said first periodic pulse signal for producing a pulse for each period thereof having an integral proportional to the cable vibration frequency thereby producing a second periodic pulse signal having an average level proportional to the square of the cable vibration frequency; and
   fourth means for scaling said second periodic pulse signal to produce a third signal having an average level proportional to cable tension.

3. Apparatus as set forth in claim 2 wherein said third means comprises means for converting said first periodic pulse signal to produce a fourth signal representative of the frequency of said first periodic pulse signal; and means supplied with and responsive to said fourth signal for modifying the pulse amplitudes of said first periodic pulse signal in accordance with the level of said fourth signal.

4. Apparatus as set forth in claim 3 wherein said converting means and said means for modifying the pulse amplitudes comprise a lowpass filter and a pulse amplitude modulator respectively.

5. Apparatus as set forth in claim 2 wherein said third means comprises means for converting said first periodic pulse signal to produce a fourth signal representative of the frequency of said first periodic pulse signal; and means supplied with and responsive to said fourth signal for modifying the pulse widths of said first periodic pulse signal in accordance with the level of said fourth signal.

6. Apparatus as set forth in claim 5 wherein said converting means and said means for modifying the pulse widths comprise a lowpass filter and a pulse width modulator respectively.

7. A method for measuring the tension in a length of stressed cable suspended between two supports comprising the steps of affixing a radiating element to the cable, imparting a disturbance to the cable thereby causing the cable hence the said radiating element thereon to vibrate at the natural vibration frequency, subjecting a sensor to the fluctuating field generated by the said radiating element thereby generating an electrical signal having a frequency equal to the cable vibration frequency, generating from said electrical signal a periodic pulse signal having a frequency equal to the cable vibration frequency and having an average level proportional to the square of the cable vibration frequency, and scaling said periodic pulse signal to produce a signal proportional to cable tension.

8. Apparatus for measuring the tension in a length of stressed cable suspended and vibrating between two supports comprising:
   a radiating element affixed to the cable;
   sensing means responsive to said radiating element thereby generating a first electrical signal representative of cable vibration;
   means for generating from said first electrical signal a second signal having an average level proportional to the square of the cable vibration frequency; and
   means for scaling said second signal to produce a third signal proportional to cable tension.

9. Apparatus as set forth in claim 8 wherein said radiating element and said sensing means comprise a magnet and pickup coil respectively.

10. Apparatus as set forth in claim 8 wherein said radiating element and said sensing means comprise a light source and photodetector respectively.

11. Apparatus as set forth in claim 8 wherein said scaling means comprises a variable resistor.

12. Apparatus for measuring the tension in a length of stressed cable suspended and vibrating between two supports comprising:
   a radiating element affixed to the cable;
   sensing means responsive to said radiating element thereby generating an electrical signal representative of the cable vibration;
   means for generating from said electrical signal a first periodic pulse signal the pulses of which have constant amplitudes and constant widths and having a frequency equal to the cable vibration frequency;

means for generating from said first periodic pulse signal a rectangular pulse for each period thereof having an integral proportional to the cable vibration frequency thereby producing a second periodic pulse signal having an average level proportional to the square of the cable vibration frequency;

means for scaling said second periodic pulse signal to produce a third signal having an average level proportional to cable tension; and indicating means supplied with said third signal for displaying indicia of cable tension.

* * * * *